US011988329B1

(12) United States Patent
Horvath et al.

(10) Patent No.: US 11,988,329 B1
(45) Date of Patent: May 21, 2024

(54) GREASE DELIVERY WITH ACCUMULATED PRESSURE

(71) Applicant: ZP Interests, LLC, Spring, TX (US)

(72) Inventors: Balazs Horvath, Spring, TX (US); Charles W. Bedford, Houston, TX (US)

(73) Assignee: ZP INTERESTS, LLC, Spring, TX (US)

(*) Notice: Subject to any disclaimer, the term of this patent is extended or adjusted under 35 U.S.C. 154(b) by 77 days.

(21) Appl. No.: 17/870,364

(22) Filed: Jul. 21, 2022

Related U.S. Application Data

(60) Provisional application No. 63/224,031, filed on Jul. 21, 2021.

(51) Int. Cl.

| | |
|---|---|
| ***F16N 13/22*** | (2006.01) |
| ***E21B 43/26*** | (2006.01) |
| ***F16N 11/10*** | (2006.01) |
| ***F16N 25/00*** | (2006.01) |

(52) U.S. Cl.
CPC .......... *F16N 11/10* (2013.01); *E21B 43/2607* (2020.05); *F16N 25/00* (2013.01); *F16N 2280/02* (2013.01)

(58) Field of Classification Search
CPC ....... E21B 43/2607; F16N 11/00; F16N 11/10
See application file for complete search history.

(56) References Cited

U.S. PATENT DOCUMENTS

| | | | | |
|---|---|---|---|---|
| 4,821,799 | A * | 4/1989 | Wong | E21B 33/072 277/330 |
| 8,944,159 | B2 * | 2/2015 | Guidry | E21B 43/2607 166/177.5 |
| 8,978,763 | B2 * | 3/2015 | Guidry | E21B 43/2607 166/308.1 |
| 10,260,327 | B2 * | 4/2019 | Kajaria | E21B 47/00 |
| 10,816,137 | B2 | 10/2020 | Herman et al. | |
| 11,137,109 | B2 * | 10/2021 | Babineaux | F16N 11/08 |
| 2013/0233560 | A1 * | 9/2013 | Davidson | E21B 43/2607 166/308.1 |
| 2015/0345272 | A1 * | 12/2015 | Kajaria | E21B 34/025 166/308.1 |
| 2017/0114957 | A1 * | 4/2017 | Conley | F16N 29/02 |
| 2017/0146189 | A1 * | 5/2017 | Herman | F16N 13/22 |
| 2017/0276293 | A1 * | 9/2017 | McKim | F16N 21/00 |
| 2017/0336022 | A1 * | 11/2017 | Gouge | F16N 7/385 |
| 2018/0328536 | A1 * | 11/2018 | Gouge | F16N 11/00 |
| 2020/0018439 | A1 * | 1/2020 | Harrel | F16N 23/00 |
| 2020/0332954 | A1 * | 10/2020 | Babineaux | E21B 41/00 |
| 2020/0347990 | A1 * | 11/2020 | McKim | F16N 25/00 |
| 2021/0381640 | A1 * | 12/2021 | Gouge | F16N 25/00 |
| 2022/0186583 | A1 * | 6/2022 | Cain | F16N 11/00 |

* cited by examiner

*Primary Examiner* — Michael A Riegelman
(74) *Attorney, Agent, or Firm* — Shackelford, Bowen, McKinley & Norton, LLP; David L. Odom

(57) ABSTRACT

A grease delivery with accumulated pressure system includes a grease accumulator comprising a first compartment containing a pressurized fluid and a second compartment containing a grease, a pressurized fluid source in communication with the first compartment, a grease reservoir connected to the second compartment through a supply conduit, and a discharge conduit extending from the second compartment to a receiving component.

5 Claims, 4 Drawing Sheets

10
46
48
44
44
44
44
42
42
42
36
38
40
12
22
16
20
18
34
14
26
16
24
30
28
20
32

10
40
50
52
32
28
30a
30b
30c
56a
56b
56c
58
54a
54b
54c
24
12
36
38
42
44
46a
46b
46c

GREASE DELIVERY WITH ACCUMULATED PRESSURE

BACKGROUND

This section provides background information to facilitate a better understanding of the various aspects of the disclosure. It should be understood that the statements in this section of this document are to be read in this light, and not as admissions of prior art.

A variety of equipment used in oil and gas operations require periodic lubricating. In particular, fracturing ("fracking") operations use numerous components that are subject to corrosive, debris filled fluids. A fracking tree, which is generally coupled to the wellhead, may have a variety of large bore gate valves that require greasing one or more times while fracking a single well.

The fracturing fluid, slick water, is pumped at high-pressure, for example in excess of 10,000 psi, and carries proppants (e.g., sand, ceramic particles) and various chemical additives. The water use per well commonly ranges between 1.5 million and 16 million gallons. The well is fractured in stages, and it is not uncommon for a single well to require 40 or more fracking stages. Gate valves have a gate that translates between an open and closed position, with the gate positioned between a pair of seats. When in the closed position, the high-pressure fluid pushes the gate against seat opposite the fluid the pressurized fluid sealing the flow passage. Pushing the gate against the opposite side seat creates a gap between the gate and the fluid side seat allowing the pressurized fluid and proppants to flow into the gate cavity. The buildup of debris in the gate cavity will limit or prevent the ability to move the gate to the open position. Additionally, the abrasive fluid will scratch the gate and seat faces degrading the sealing capability of the valve. Due to the volume, high-pressure, and abrasiveness of fracking fluid is common to have to grease the wellhead components, in particular the gate valves, during fracking operations. In some instances, the valves may be greased between each fracking stage. The time to grease the well components can significantly increase the cost of the fracking operation. Additionally, efficient greasing processes can be impeded by limited access safety zones around the high-pressure equipment. For example, a designated safety zone often extends a radius of 100 feet or more from each wellhead. The presence of people and explosion hazards are restricted from the designated safety zone.

SUMMARY

An exemplary grease delivery with accumulated pressure system includes a grease accumulator comprising a first compartment containing a pressurized fluid and a second compartment containing a grease, a pressurized fluid source in communication with the first compartment, a grease reservoir connected to the second compartment through a supply conduit, and a discharge conduit extending from the second compartment to a receiving component.

Another exemplary grease delivery with accumulated pressure system includes a first station having a grease reservoir connected to a first manifold through a pump, a second station with a grease accumulator containing a grease, a hydraulic accumulator in communication with the grease accumulator to pressurize the grease and a second manifold connected to the grease accumulator through a discharge conduit, a first supply conduit connects the first manifold to the grease accumulator to supply the grease from the grease reservoir and a delivery conduit extending from the second manifold to a wellhead component.

An exemplary method for greasing a wellhead component with a grease delivery with accumulated pressure system includes supplying grease from a grease reservoir to a grease accumulator at a first pressure, the grease accumulator coupled to a greasing manifold through a discharge conduit, and the greasing manifold connected to a wellhead component through a delivery conduit; applying, with a hydraulic accumulator, a second pressure to the grease in the grease accumulator; and opening a valve in the discharge conduit permitting the grease to flow under pressure from the grease accumulator to the wellhead component.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion. As will be understood by those skilled in the art with the benefit of this disclosure, elements and arrangements of the various figures can be used together and in configurations not specifically illustrated without departing from the scope of this disclosure.

DETAILED DESCRIPTION

Figure 1:
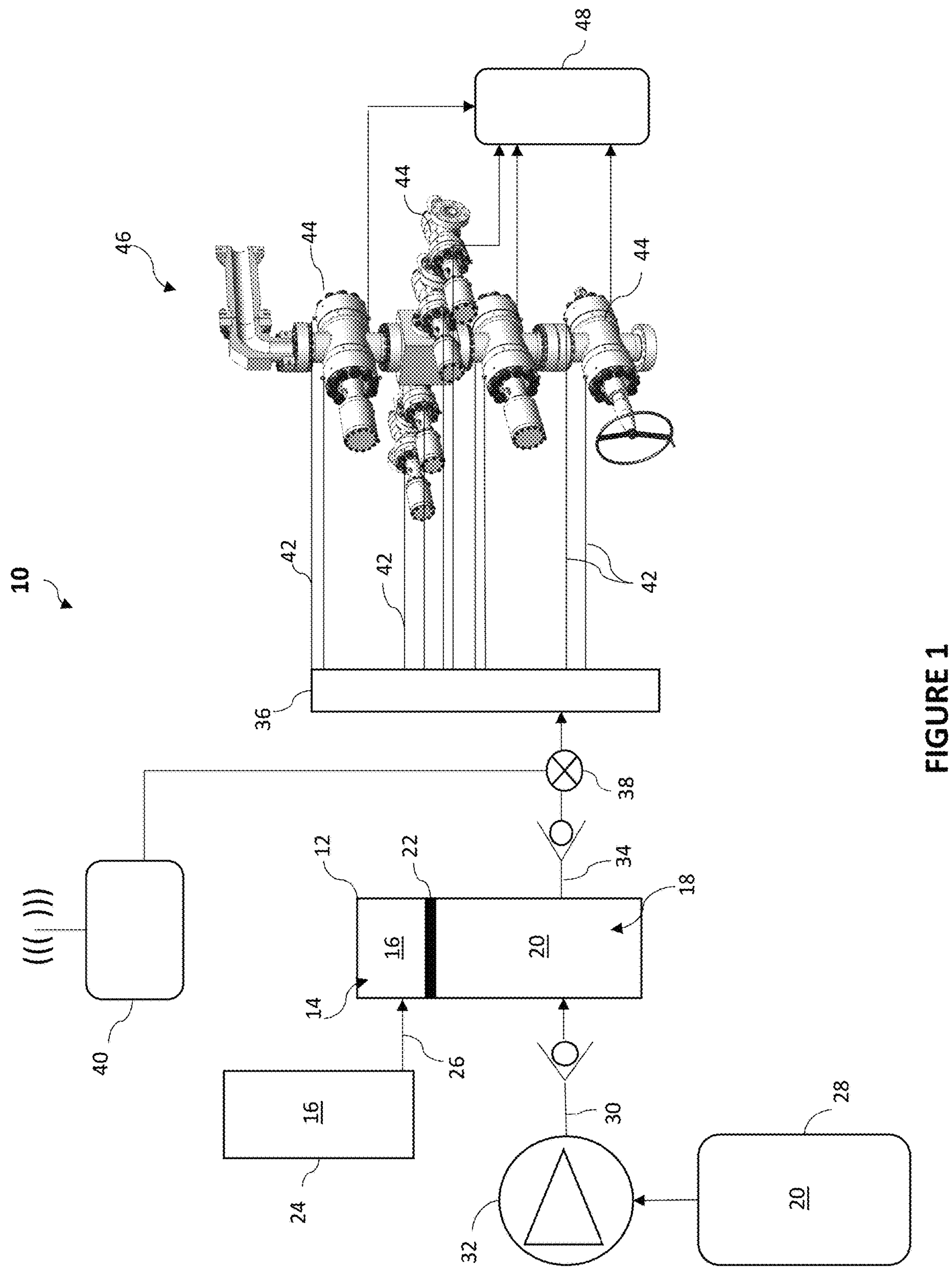
FIG. 1 is a schematic illustration of an exemplary grease delivery system.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

FIG. 1 is a schematic illustration of an exemplary grease delivery with accumulated pressure system, generally denoted by the numeral 10, in operational connection with components to be greased. In this example, the operational components are wellhead components, in particular components such as valves in a fracturing tree. As will be understood with benefit of this disclosure, the grease delivery system is not limited to use with fracturing tree components, wellhead components, or wellbore systems.

System 10 includes a grease accumulator 12 having a first compartment 14 containing a pressurized fluid 16 and a second compartment 18 containing a lubricant 20, such as grease. Grease accumulator is a pressure containing vessel and may have a piston 22, or other moveable barrier, separating the first and second compartments.

A pressurized fluid source 24 is in communication with first compartment 14, via conduit 26, to supply pressurized fluid 16 to grease accumulator 12. Pressurized fluid 16 may be a gas or liquid. In an exemplary system 10, pressurized fluid 16 is a hydraulic fluid. Pressurized fluid source 24 may include a pump to pressurize the fluid. In the illustrated exemplary systems, pressurized fluid source 24 is an accumulator that can be located in close proximity to grease accumulator 12. Pressurized fluid source 24 can be sized to have sufficient volume to maintain grease accumulator 12 at a desired operating pressure as grease 20 is discharged during greasing operations.

A lubricant, or grease, reservoir 28 is in communication with second compartment 18 through a supply conduit 30. Lubricant reservoir 28 may hold grease 20 for example at atmospheric pressure. Lubricant reservoir 28 may be a bulk container holding a volume sufficient to fill grease accumulator multiple times. Supply conduit 30 may include a lubricant pump 32 to pressurize and transfer grease 20 to the grease accumulator. Pump 32 may pressurize the grease to a desired working pressure of the grease accumulator. In some systems, pump 32 may pressurize the grease to a first pressure that is less than a second pressure that is provided by pressurized fluid 16 in the grease accumulator. For example, prior to grease accumulator 12 being fully pressurized, pump 32 may fill second compartment 18 with grease 20 at a first pressure. The first pressure may be a low-pressure, for example, depending on the particular fracking operating parameters, less than 7,500 psi. As will be understood by those skilled in the art, the low-pressure and high-pressure ranges will depend on the particular application. Using a lower pressure to supply the grease to the grease accumulator permits using larger diameter conduit and reducing the pressure drop along the length of the supply conduit. The second pressure applied by the pressurized fluid source 24 may be a high-pressure, for example, 10,000 psi or greater, to facilitate greasing the operational components during fracking operations.

A discharge conduit 34 extends from second compartment 18 to a receiving component, such as a manifold or directly to a operational component to be greased. In FIG. 1, discharge conduit 34 extends to a supply manifold 36. Discharge conduit 34 has a control valve 38 to selectively open and close flow of pressurized grease from the grease accumulator to the supply manifold. Control valve 38 may be in communication, via wire or wireless, to a remotely located controller 40. Controller 40 can be used to remotely open and close control valve 38 to perform greasing operations.

Manifold 36 has one or more delivery conduits 42 configured to supply the pressurized grease to operational components 44 for greasing. In the illustrated examples, there are a plurality of delivery conduits 42 to simultaneously grease two or more operational components. In FIG. 1, operational components 44 are wellhead components, for example, valves in a fracking tree 46. System 10 may include a waste vessel 48 connected to operational components 44 to receive waste grease that is disposed from the operational components during greasing.

Grease accumulator 12 facilitates maintaining pressurized grease on-hand and at the ready to grease a component when required. Grease accumulator 12 can be located in close proximity to the operational components minimizing pressure loss in conveying the high-pressure, high viscosity grease to the operational component. The close proximity also reducing the length of conduit that is subject failure. Additionally, the grease accumulator and pressurized fluid source 24, in particular as an accumulator, provides a compact footprint. System 10 also facilitates placement the bulk grease reservoir 24 as a remote location removed from the operational components and the risk of damage if there is a failure at the location of the high-pressure operational components.

Figure 2:
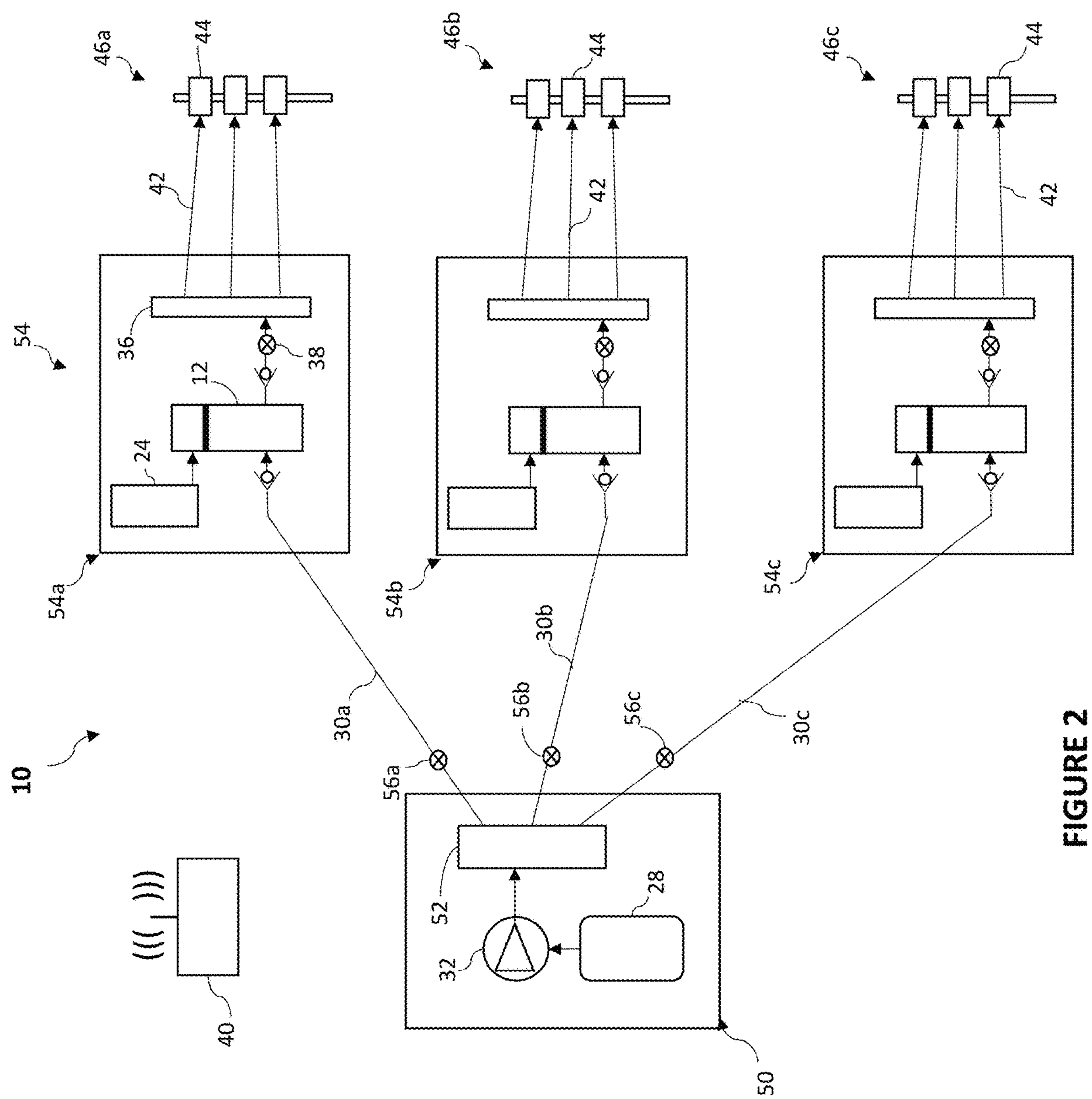
FIG. 2 is another schematic illustration of an exemplary grease delivery system with locally positioned pressurized grease accumulators.

FIG. 2 illustrates exemplary grease delivery with accumulated pressure system 10, which is described with reference to FIG. 1. In this example, a first station 50 includes grease reservoir 28, pump 32, and a first manifold 52. First station 50 may be a truck, skid, and/or pad. System 10 includes one or more second, or local, stations 54 individually identified with 54*a*, 54*b*, 54*c*, etc. The local stations may be a truck, skid, pad, and/or frame supporting the system components. Each local station 54 includes a grease accumulator 12, a pressurized fluid source 24, and supply manifold 36. Grease accumulator 12 of each local station 54*a*, 54*b*, 54*c* is connected to first manifold 52 by a respective supply conduit 30*a*, 30*b*, 30*c*. Supply conduits 30*a*, 30*b*, 30*c* may include respective control valves 56*a*, 56*b*, 56*c*, for example in communication with controller 40, permitting selective transferring of pressurized grease to the grease accumulators at different local stations.

Each local station can be located adjacent to and in close proximity to the component(s) to be greased. In FIG. 2, local stations 54*a*, 54*b*, 54*c* are each positioned proximate to a respective wellbore depicted by fracking trees 46*a*, 46*b*, 46*c*. Local stations 54*a*, 54*b*, 54*c* each comprise delivery conduits 42 extending to operational components 44 of the respective fracking trees 46*a*, 46*b*, 46*c*. As illustrated in FIG. 1, systems 10 may include waste vessels to receive the grease that is displaced from the operational components during greasing.

First station 50 can be located at a remote location removed from proximity to the wellbores and out of the way of the fracking trucks and other equipment.

Figure 3:
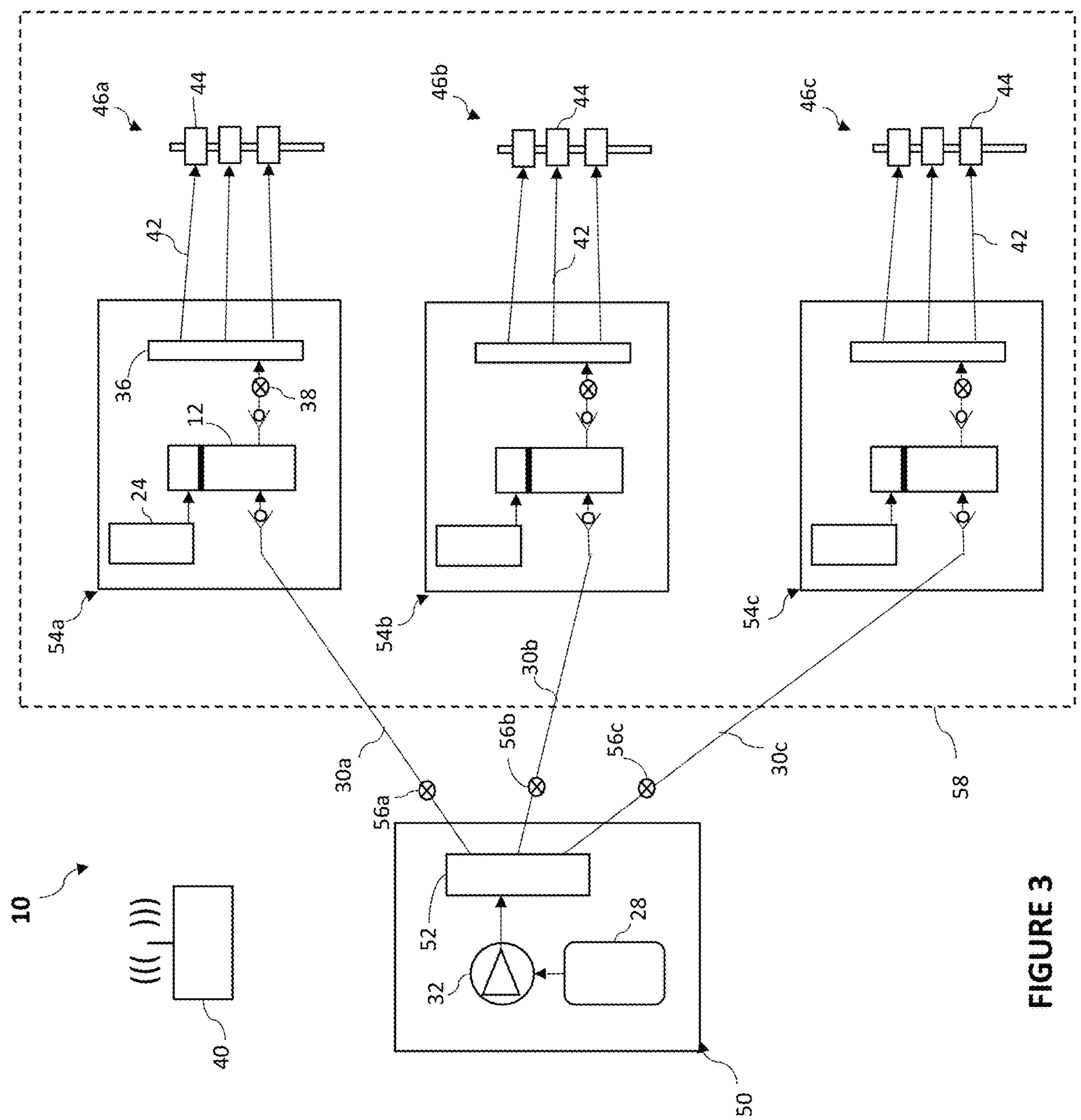
FIG. 3 illustrates a designated safety zone relative to the exemplary system of FIG. 2.

FIG. 3 illustrates system 10 of FIG. 2 with relation to a "safety zone" 58. Safety zone 58 is the area inside of the box. A box is used for simplicity to illustrate a zone, or area, around the wellbores in which the presence of people and some equipment is restricted. System 10 and safety zone 58 are not drawn to scale. For example, and without limitation, the perimeter of the safety zone 58 is about 100 feet from each fracking tree. The local stations may be located in close proximity to the wellbores, for example within tens of feet, with the first station located outside of the safety zone.

Figure 4:
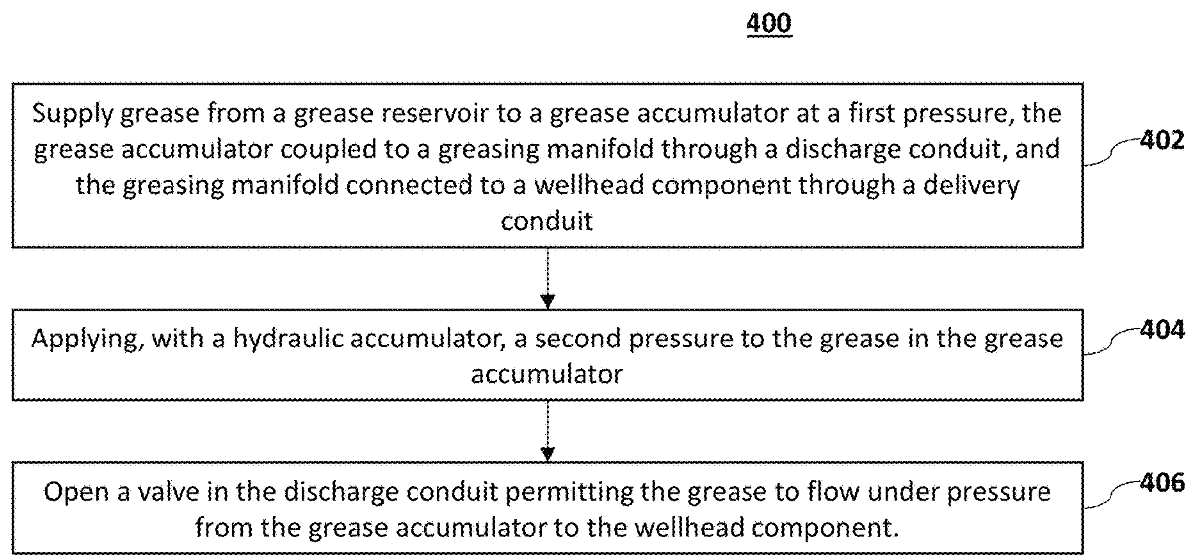
FIG. 4 is a flow chart of an exemplary method of greasing an operation component.

FIG. 4 is a flowchart of an exemplary method 400 for greasing a wellhead component with a grease delivery with accumulated pressure system 10. The method is described with additional reference to FIGS. 1-3. At block 402, grease 20 from a grease reservoir 28 suppled to a grease accumulator 12 at a first pressure. The grease accumulator is coupled to a greasing manifold 36 through a discharge conduit 34 and the greasing manifold is connected to one or more wellhead components 44 through one or more delivery conduits 42. At block 404, a second pressure is applied, for example with a hydraulic accumulator 24, to the grease in the grease accumulator. The second pressure may be greater than the first pressure. At block 406, a control valve 38 in the discharge conduit is opened perming the pressurized grease to flow from the grease accumulator to the wellhead component and thereby grease the component.

Although relative terms such as "outer," "inner," "upper," "lower," and similar terms have been used herein to describe a spatial relationship of one element to another, it is understood that these terms are intended to encompass different orientations of the various elements and components in addition to the orientation depicted in the figures. Additionally, as used herein, the term "substantially," "about," "generally," and similar terms are used as terms of approximation and not a terms of degrees, and are intended to account for the inherent deviations in measured and calculated values that would be recognized by a person of skill in the art. Furthermore, as used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method for greasing a wellhead component with a grease delivery with accumulated pressure system, the method comprising:

supplying grease from a grease reservoir to a grease accumulator at a first pressure, the grease accumulator coupled to a greasing manifold through a discharge conduit, and the greasing manifold connected to the wellhead component through a delivery conduit;

applying, with a hydraulic accumulator, a second pressure to the grease in the grease accumulator; and opening a valve in the discharge conduit permitting the grease to flow under pressure from the grease accumulator to the wellhead component;

wherein a plurality of local stations, each of which comprises a local grease accumulator, a local hydraulic accumulator, and a local greasing manifold;

the local stations located proximate to a respective local wellhead tree comprising wellhead components connected to the respective local greasing manifold; and the grease reservoir located at a remote station removed from the local stations and connected through a first manifold to the local grease accumulators, wherein the remote station is located outside of a zone in which people are excluded during fracturing operations, wherein the local stations are located inside of the zone.

2. The method of claim 1, further comprising permitting waste grease to be displaced from the wellhead component to a waste vessel in response to permitting the grease to flow from the grease accumulator to the wellhead component.

3. The method of claim 1, wherein the greasing manifold is connected to two or more wellhead components through two or more delivery conduits.

4. The method of claim 1, wherein the grease accumulator, the hydraulic accumulator, and the greasing manifold are positioned at a local station proximate to the wellhead component; and the grease reservoir is located at a remote station removed from the local station.

5. The method of claim 4, wherein the remote station is located outside of a zone in which people are excluded during fracturing operations; and the local station is located inside of the zone.

* * * * *